Jan. 29, 1957 P. M. FISCHER 2,779,911

MEANS FOR REDUCING OR NULLIFYING THE MINIMUM OUTPUT CURRENT OF MAGNETIC AMPLIFIERS

Filed Feb. 12, 1954 2 Sheets-Sheet 1

Inventor
Paul M. Fischer
By W. C. Lyon
Attorney

MEANS FOR REDUCING OR NULLIFYING THE MINIMUM OUTPUT CURRENT OF MAGNETIC AMPLIFIERS
Filed Feb. 12, 1954
2 Sheets-Sheet 2

Inventor
Paul M. Fischer
By W. C. Lyon
Attorney

United States Patent Office 2,779,911
Patented Jan. 29, 1957

2,779,911

MEANS FOR REDUCING OR NULLIFYING THE MINIMUM OUTPUT CURRENT OF MAGNETIC AMPLIFIERS

Paul M. Fischer, Milwaukee, Wis., assignor to Cutler-Hammer, Inc., Milwaukee, Wis., a corporation of Delaware Application February 12, 1954, Serial No. 409,853

7 Claims. (Cl. 323—89)

Figure 1:
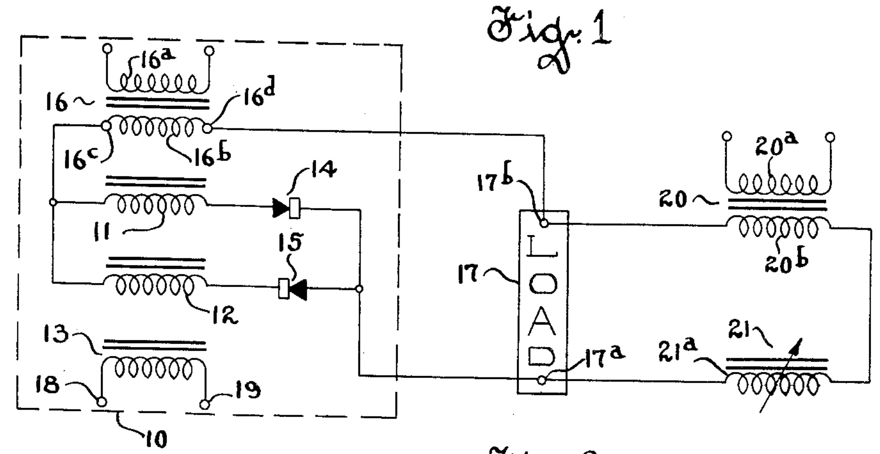

This invention relates to means for reducing or nullifying the minimum output current of magnetic amplifiers.

In the conventional magnetic amplifier circuit the magnetizing current is also the minimum output current to the load, and in commercially available magnetic amplifiers amounts to approximately 5 to 10 percent of the rated maximum output current. For many applications a current range greater than 20 to 1 is desired, and thus it is necessary to find means for reducing or nullifying the minimum output value.

Attempting to obtain the necessary reduction in minimum output current by perfecting the design and manufacture of magnetic amplifiers themselves is difficult and costly, whereas a scheme permitting the use of standard design magnetic amplifiers together with other readily available components and only involving change in existing circuitry is highly desirable.

It is the object of the present invention to provide improved means for substantially and entirely nullifying the minimum output current supplied to loads by magnetic amplifiers, and Another object is to provide means of the aforementioned type which are separate from and may be readily connected to loads being supplied by standard types of magnetic amplifiers to provide the aforementioned nullifying action.

Other objects of the invention will hereinafter appear.

Figure 2:
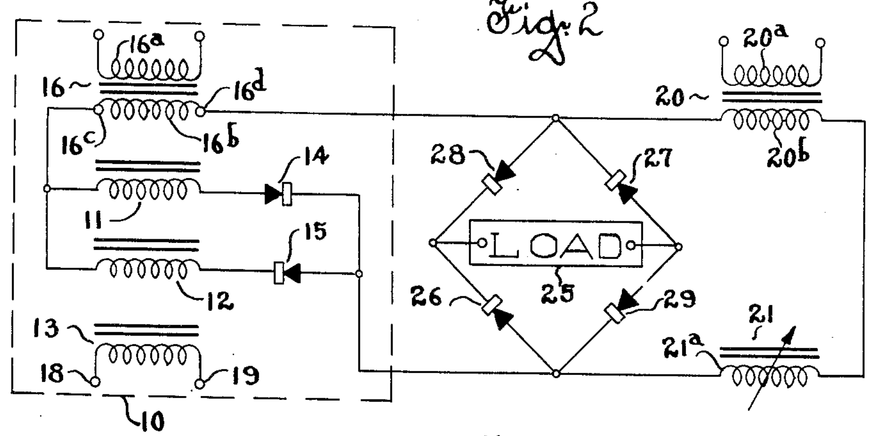
Figure 3:
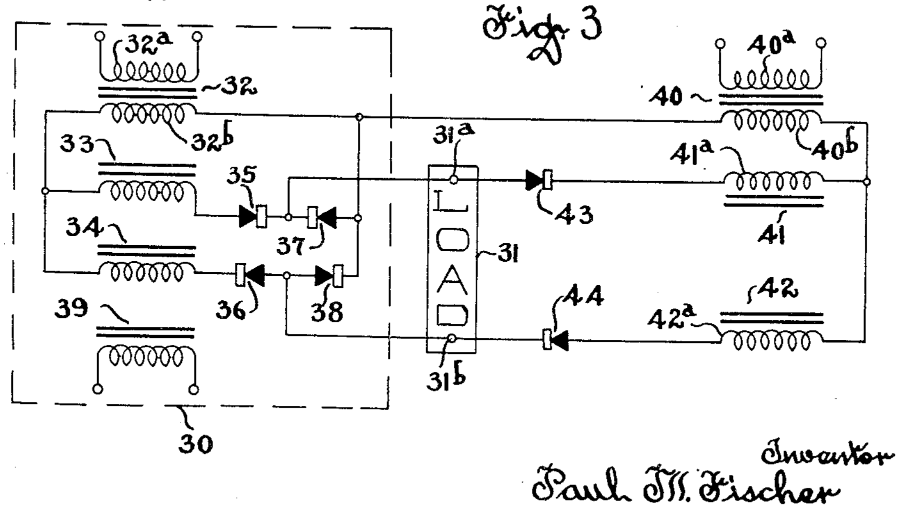

In the drawings:

Figure 1 is a diagram depicting the employment of one embodiment of the invention in conjunction with a magnetic amplifier supplying A. C. to a load, Fig. 2 is a modification of the system of Fig. 1 wherein the magnetic amplifier is supplying rectified A. C. to the load, Fig. 3 shows another embodiment of the invention as applied to a magnetic amplifier supplying rectified A. C. to a load.

Figure 4:
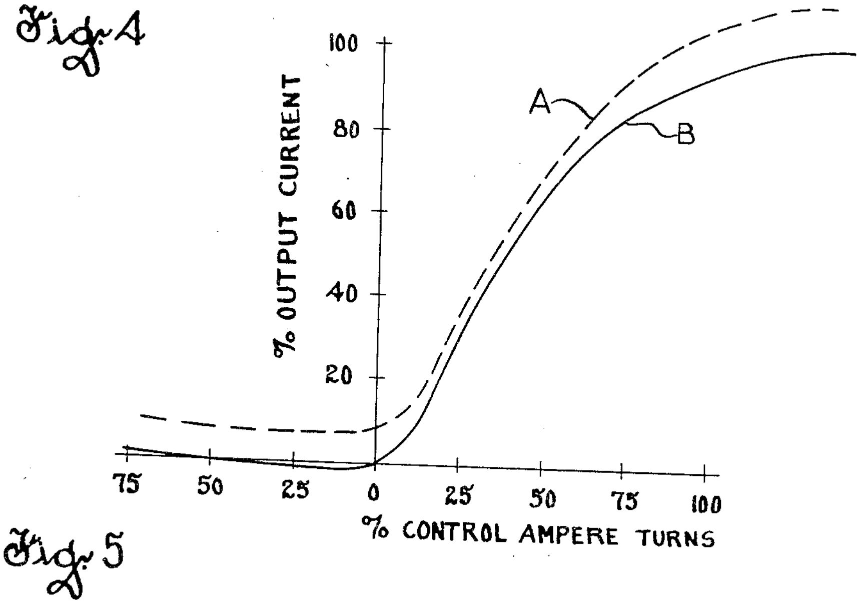
Figure 5:
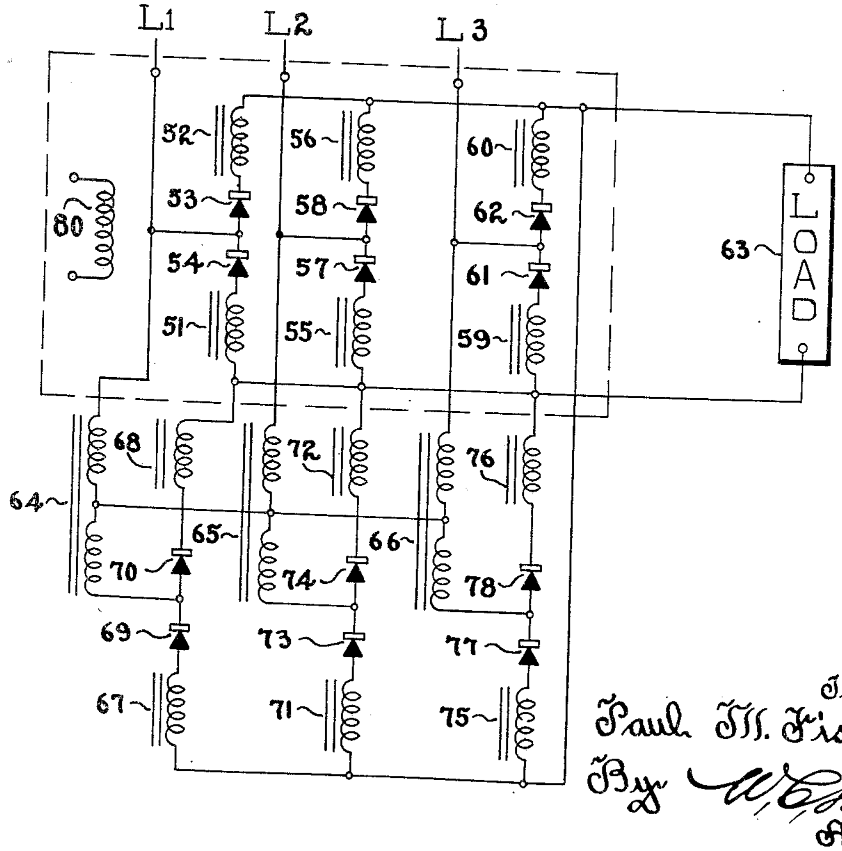

Fig. 4 is a graph showing output current vs. input signal relations in the system of Fig. 3, and Fig. 5 shows still another embodiment of the invention as applied to a system wherein a polyphase magnetic amplifier supplies rectified A. C. to a load.

Referring to Fig. 1, it shows a common form of magnetic amplifier, indicated by the broken line rectangle 10, which comprises A. C. main windings 11 and 12, a D. C. control winding 13, half-wave rectifiers 14 and 15 and a transformer 16 having a primary winding 16$^a$ and a secondary winding 16$^b$. Windings 11 and 12 are connected at corresponding ends to an end terminal 16$^c$. of secondary winding 16$^b$. At their other ends windings 11 and 12 are connected in series with the rectifiers 14 and 15, respectively, to a terminal 17$^a$ of a load 17; rectifiers 14 and 15 being connected in the opposed conducting relations shown. Load 17 is connected at its other terminal 17$^b$ to the other end terminal 16$^d$ of secondary winding 16. Control winding 13 may be assumed to be supplied at its terminals 18 and 19 with a variable D. C. signal voltage, and primary winding 16$^a$ may be assumed to be connected to a suitable source of single phase A. C. supply. It will be seen that amplifier 10 will supply an alternating output potential to load 17 whose magnitude varies with variation in the D. C. input voltage at terminals 18 and 19.

In accordance with the present invention, I provide a transformer 20, having a primary winding 20$^a$ for connection to a source of single phase A. C. supply and a secondary winding 20$^b$, and a variable reactor 21 having a winding 21$^a$. Secondary winding 20$^b$ and reactor winding 21$^a$ are connected in series across terminals 17$^a$ and 17$^b$ of load 17. By proper selection of transformer 20 and reactor 21, and of adjustment of the latter, it has been found that the effective value of current flowing through load 17, with the control current in winding 13 adjusted to minimum value, the minimum output current can be reduced to a very low value.

At minimum output current condition transformer 20 supplies one-half of the excitation power required by the magnetic amplifier and reactor, and hence no magnetizing current need flow in the load. At maximum output current condition, with the magnetic amplifier completely saturated, a small percentage of the normal load current is shunted through reactor 21 and is not available to the load, thus derating the magnetic amplifier powerwise approximately 1 percent. Transformer 20 need only be large enough to supply the excitation requirements of the amplifier, and hence can be quite small. For best results the output voltage of transformer 20 should be equal to or greater than the A. C. input voltage rating for the magnetic amplifier.

Fig. 2 depicts a slightly modified form of the system of Fig. 1 wherein the amplifier 10 is supplying a load 25 with a rectified A. C. output through the medium of a full-wave rectifier bridge circuit comprising half-wave rectifiers 26, 27, 28 and 29. Transformer 20 and reactor 21 afford the same nullifying action as in the system of Fig. 1.

Fig. 3 depicts still another form of the invention. It shows a magnetic amplifier 30 providing a rectified output to a load 31. Amplifier 30 comprises a transformer 32 having a primary winding 32$^a$ and a secondary winding 32$^b$. A. C. main windings 33 and 34, half-wave rectifiers 35, 36, 37 and 38, and a D. C. control winding 39. In accordance with this form of the invention I provide a transformer 40 having a primary winding 40$^a$ and a secondary winding 40$^b$. One end of winding 40$^a$ is connected with the adjacent end of winding 32$^b$ of the amplifier to the opposed rectifiers 37 and 38, and is connected at its other end to corresponding ends of windings 41$^a$ and 42$^a$ of reactors 41 and 42. Winding 41$^a$ is connected at its other end through a half-wave rectifier 43 to terminal 31$^a$ of load 31, and winding 42$^a$ is connected at its other end through a half-wave rectifier 44, which is in opposed conducting reaction to rectifier 43, to the other terminal 31$^b$ of load 31. It has been found that with proper selection of transformer 40 and reactors 41 and 42, that the minimum output current flowing through load 31 can be reduced to zero, and even a slightly negative output current can be obtained. Curve B of Fig. 4 depicts the relationship of output current to input ampere turns that can be obtained with the system of Fig. 3, whereas curve A depicts the same relationship without the use of transformer 40, reactors 41 and 42, and rectifiers 43 and 44.

Fig. 5 shows a minimum output current nullifying system as applied in conjunction with a conventional form of three phase magnetic amplifier supplying the load with rectified alternating current. The magnetic amplifier, which is generally designated by the broken line 50, comprises a first pair of A. C. windings 51 and 52 connected in series with half-wave rectifiers 53 and 54, a second pair of A. C. windings 55 and 56 connected in series with half-wave rectifiers 57 and 58, and a third pair of A. C. windings 59 and 60 connected in series with half-wave rectifiers 61 and 62. All of said series connected pairs of windings and rectifiers are connected in parallel across a load 63. The point common between rectifiers 53 and 54 is connected to supply line L1 of a three phase A. C. source, the point common between rectifiers 57 and 58 is connected to line L2 of said source and the point common between rectifiers 61 and 62 is connected to line L3. A D. C. signal winding 80 may be assumed to be supplied with a D. C. voltage varying from zero to a predetermined maximum.

The minimum output current nullifying circuit comprises center tapped autotransformers 64, 65 and 66, a first pair of reactors 67 and 68 connected in series with half-wave rectifiers 69 and 70. A second pair of reactors 71 and 72 connected in series with half-wave rectifiers 73 and 74, and a third pair of reactors 75 and 76 connected in series with half-wave rectifiers 77 and 78. Transformers 64, 65 and 66 are connected at corresponding ends to supply lines L1, L2 and L3, respectively, and have their center taps interconnected. At its other end transformer 64 is connected to the point common between rectifiers 69 and 70, transformer 65 is similarly connected at its other end to the point common between rectifiers 73 and 74, and transformer 66 is correspondingly connected at its other end to the point common between rectifiers 75 and 78. The respective pairs of reactors and series connected rectifiers are connected in parallel across the load. The minimum output current nullification obtained with the system of Fig. 5 is comparable to that of the single phase system of Fig. 3.

I claim:

1. In combination, a source of alternating current supply, a load device, a magnetic amplifier deriving power from said source and supplying said load device with amplified current in accordance with the level of a D. C. input signal, and a circuit for minimizing the current normally supplied to said load device by said amplifier at zero input signal thereto comprising an inductive reactor and a transformer having an input winding, and an output winding connected in series with the winding of said reactor across said load device.

2. In combination, a source of alternating current supply, a load device connected at one side to one side of said source, a magnetic amplifier having A. C. windings connected to another side of said source and having half-wave rectifiers connected in series with said A. C. windings to the other side of said load device, and a circuit for minimizing the current supplied to said load device by said amplifier at zero signal input to the latter comprising an inductive reactor and a transformer having an output winding connected in series with the winding of said reactor across said load device.

3. In combination, a full-wave rectifier bridge, a load device connected across one diagonal of said bridge, a source of alternating voltage, a magnetic amplifier having connection with said source, D. C. signal input terminals, and output terminals connected across the other diagonal of said bridge, and a circuit for nullifying the voltage applied across said load device by said amplifier at zero D. C. input signal of the latter comprising an inductive reactor and a transformer having its output winding connected in series with said reactor across said other diagonal of said rectifier bridge.

4. In combination, a load device, a source of alternating voltage supply, a magnetic amplifier comprising a D. C. input signal and having rectifying means in circuit with its A. C. winding, one side of said source and said load device for impressing a rectified alternating voltage output across the latter, and a circuit for nullifying the output current to said load device at zero signal input to said amplifier, comprising a transformer having an output winding connected at one end to said one side of said source, a pair of inductive reactors connected at corresponding ends to the other end of said transformer output winding, and half-wave rectifiers connected in series with associated ones of the windings of said reactors, and in opposed conducting relation to each other, to opposite sides of said load device respectively.

5. In combination, a source of polyphase alternating voltage supply, a magnetic amplifier deriving power from said source and supplying said load device with a rectified polyphase alternating voltage in accordance with the level of its D. C. input signal, and a network for nullifying the current normally supplied to said load device by said amplifier at zero input signal level of the latter, comprising a plurality of like circuits corresponding in number to the phases of said source connected in parallel across said load device, each of said circuits including a pair of inductive reactors and a pair of half-wave rectifiers connected between and in series with the windings of said reactors, and a plurality of center tapped autotransformers corresponding in number to the phases of said source having their center tap interconnected, having corresponding ends connected to the points common between a pair of rectifiers of their respective associated circuits, and having their other corresponding ends connected to their respective associated phases of said source.

6. For minimizing the current normally supplied to a load device by a magnetic amplifier with zero input signal to the latter, a circuit for connection across the load device comprising an inductive reactor and a transformer having an input winding for connection to a source of A. C. supply and an output winding connected in series with the winding of said reactor, said reactor being so selected in respect of its inductive reactance and said transformer being so selected with respect to its output voltage that said circuit will subject the load device to a voltage equal to but in opposition to the voltage which said load device is subjected by the magnetic amplifier at minimum input signal.

7. For nullifying the current normally supplied to a load device at zero signal input by a magnetic amplifier deriving power from a polyphase A. C. source, a network for connection across the load device comprising a plurality of like circuits corresponding in number to the phases of said source connected in parallel, each of said circuits including a pair of inductive reactors and a pair of half-wave rectifiers connected between and in series with the windings of said reactors, and a plurality of center tapped autotransformers corresponding in number to the phases of said source having their center taps interconnected, and corresponding ends thereof connected to the points common between a pair of rectifiers of respective associated circuits and being connectable at their other ends to respective associated phases of said source.

References Cited in the file of this patent

UNITED STATES PATENTS 2,644,129 Ramey ______________ June 30, 1953